United States Patent
Chou

(10) Patent No.: US 10,112,354 B2
(45) Date of Patent: Oct. 30, 2018

(54) METHOD FOR MANUFACTURING TOUCH PANEL

(71) Applicant: WUHAN CHINA STAR OPTOELECTRONICS TECHNOLOGY CO., LTD., Hubei (CN)

(72) Inventor: Shihpo Chou, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 168 days.

(21) Appl. No.: 15/228,897

(22) Filed: Aug. 4, 2016

(65) Prior Publication Data

US 2017/0246818 A1    Aug. 31, 2017

(30) Foreign Application Priority Data

Feb. 29, 2016  (CN) .......................... 2016 1 0111033

(51) Int. Cl.
 *B29D 11/00* (2006.01)
 *B29C 45/14* (2006.01)
 (Continued)

(52) U.S. Cl.
 CPC .. *B29D 11/00807* (2013.01); *B29C 45/14639* (2013.01); *B29C 45/53* (2013.01);
 (Continued)

(58) Field of Classification Search
 None
 See application file for complete search history.

(56) References Cited

U.S. PATENT DOCUMENTS 9,426,893 B2 * 8/2016 Huang ..................... G06F 3/044
9,872,409 B2 * 1/2018 Isoda ....................... H05K 7/00
(Continued)

FOREIGN PATENT DOCUMENTS

| CN | 203299773 U | 11/2013 |
|----|-------------|---------|
| CN | 103568196 A | 2/2014  |
| TW | 201017499 A | 5/2010  |

OTHER PUBLICATIONS

Crescent Industries, Inc. ("What are Causes of Flash in Plastic Molding?", http://info.crescentind.com/blog/bid/72378/what-are-causes-of-flash-in-plastic-injection-molding, Sep. 28, 2014, Wayback Machine, 2 pages) (Year: 2014).*

*Primary Examiner* — Lisa L Herring
(74) *Attorney, Agent, or Firm* — WPAT, PC

(57) ABSTRACT

A method for manufacturing a touch panel, comprising the steps of: placing a touch sensor layer and a flexible printed circuit board connected to the touch sensor layer into a mold cavity constructed by a stationary mold board and a movable mold board of a cover lens mold; injecting a melted plastic material into the mold cavity; removing, after the plastic material is molded, the movable mold board, and withdrawing the touch sensor layer and the flexible printed circuit board that are covered by the molded plastic material; and removing the molded plastic material covering the flexible printed circuit board, the molded plastic material covering the touch sensor layer forming a cover lens. Such a manufacture method can solve the problem of difficulty to adhere a curved cover lens to the touch sensor layer in the existing skills.

1 Claim, 3 Drawing Sheets

(51) Int. Cl.
   *B29C 45/53*   (2006.01)
   *B29L 31/34*   (2006.01)
(52) U.S. Cl.
   CPC ............... *B29L 2031/3475* (2013.01); *G06F 2203/04103* (2013.01)

(56) References Cited

U.S. PATENT DOCUMENTS

| | | | |
|---|---|---|---|
| 2006/0171127 A1 | 8/2006 | Kadoya et al. | |
| 2008/0145578 A1* | 6/2008 | Yuba ................ | B29C 45/14221 428/35.7 |
| 2009/0286054 A1* | 11/2009 | Meiki ............... | B29C 45/14827 428/200 |
| 2014/0043772 A1* | 2/2014 | Isoda ....................... | H05K 7/00 361/728 |
| 2014/0064051 A1* | 3/2014 | Zhou ...................... | G11B 27/36 369/53.44 |
| 2015/0293558 A1* | 10/2015 | Hahn ................. | B29C 45/1418 345/174 |

* cited by examiner

METHOD FOR MANUFACTURING TOUCH PANEL

TECHNICAL FIELD OF THE INVENTION

The present invention relates to a touch control technology, and more particularly, to a method for manufacturing a touch panel.

BACKGROUND OF THE INVENTION

A cover lens is located at the outermost layer of a touch panel and is a first interface direct linking to a user, closest to the user's finger. The cover lens takes a glass substrate as its substrate material and is adhered to a touch sensor or touch sensor film so as to form a touch panel. However, the existing glass cover lens is relatively heavy and has insufficient impact resistance, and therefore the focus of the market has started to shift to using a plastic substrate to manufacture the cover lens.

Because of low density of the plastic substrate, it can meet user requirements of a thin, light, and portable device (e.g., a smart phone and a tablet). Further, the plastic cover is easily to be shaped to form a curved cover lens due to its perfect processability, and therefore it is easily to apply that to a curved display screen.

FIG. 1 is a schematic diagram showing an existing touch panel manufacture method. The existing touch panel manufacture method is generally to adhere a touch sensor layer 2 connected to a flexible printed circuit board 1 directly to a molded plastic cover 3 so as to manufacture a touch panel 4. Common adhering approaches are edge lamination and full lamination. The edge lamination uses a double faced adhesive to adhere the touch sensor layer 2 to the plastic cover 3 at four edges. The full lamination is to coat an optically clear adhesive (OCA) or an optically clear resin (OCR) between the touch sensor layer 2 and the plastic cover 3, and then they are adhered together. In the full lamination, two plates are fully adhered together without seam or air gap, and therefore light refracting is less likely to occur to affect the display quality. Therefore, compared to the edge lamination, the full lamination becomes a main stream now in manufacturing the touch panel.

However, the touch sensor layer 2 is flat and the plastic cover 3 is curved in the curved cover lens applications. No matter using the edge lamination or the full lamination, there exists a problem of difficulty to adhere the touch sensor layer 2 and the plastic cover 3 and it is hard to avoid the seam and air gap during the manufacture processes.

SUMMARY OF THE INVENTION

The objective of the present invention is to provide a method for manufacturing a touch panel for solving the problem of difficulty to adhere a curved cover lens to a touch sensor layer in the existing skills.

To achieve above objective, an aspect of the present invention provides a method for manufacturing a touch panel, comprising the steps of: placing a touch sensor layer and a flexible printed circuit board connected to the touch sensor layer into a mold cavity constructed by a stationary mold board and a movable mold board of a cover lens mold; injecting a melted plastic material into the mold cavity; removing, after the plastic material is molded, the movable mold board, and withdrawing the touch sensor layer and the flexible printed circuit board that are covered by the molded plastic material; and removing the molded plastic material covering the flexible printed circuit board, the molded plastic material covering the touch sensor layer forming a cover lens.

Another aspect of the present invention provides a method for manufacturing a touch panel, comprising the steps of: placing a touch sensor layer and a flexible printed circuit board connected to the touch sensor layer into a mold cavity constructed by a stationary mold board and a movable mold board of a cover lens mold, the touch sensor layer and the flexible printed circuit board being placed on a surface of the stationary mold board; pressing a melted plastic material such that the plastic material is squeezed into the mold cavity; removing, after the plastic material is molded, the movable mold board, and withdrawing the touch sensor layer and the flexible printed circuit board that are covered by the molded plastic material; and removing the molded plastic material covering the flexible printed circuit board, the molded plastic material covering the touch sensor layer forming a cover lens.

In the touch panel manufacture method of the present invention, the touch sensor layer and the flexible printed circuit board connected to the touch sensor layer are placed into the mold cavity constructed by the stationary mold board and the movable mold board of the cover lens mold or plastic cover mold. After plastic injection, molding, and mold release, the molded plastic material covering the flexible printed circuit board is removed. The molded plastic material covering the touch sensor layer thus forms the cover lens or plastic cover, thereby accomplishing the manufacture of touch panel. The touch sensor layer is integrated on the cover lens as soon as the cover lens is molded, and thus it can be avoided to use the existing adhering approach. Therefore, the present invention can solve the problem of difficulty to adhere a curved cover lens to the touch sensor layer in the existing skills. The touch panel manufacture method of the present invention can easily apply the curved cover lens integrating with touch control function to a curved display screen. Meanwhile, the present invention can also decrease the overall thickness of a device (e.g., a smart phone) and increase the product yield.

To make above content of the present invention more easily understood, it will be described in details by using preferred embodiments in conjunction with the appending drawings.

DETAILED DESCRIPTION OF THE INVENTION

To make the objectives, technical schemes, and effects of the present invention more clear and specific, the present invention is described in further detail below with reference to the embodiments in accompanying with the appending drawings. It should be understood that the specific embodiments described herein are merely for explaining the present invention, the term "embodiment" used in the context means an example, instance, or illustration, and the present invention is not limited thereto.

The present invention provides a method for manufacturing a touch panel. In the manufacture method, a touch sensor layer is placed into a mold cavity of a plastic cover mold or a cover lens mold. Then, plastic injection molding is proceeding for forming the plastic cover. After the plastic material is molded and peeled off, a plastic cover integrating with touch control function is carried out, that is, the manufacture of touch panel is accomplished. The touch panel manufacture method of the present invention can be used to manufacture the touch panels applied to smart phones, tablets, televisions, and etc. The present invention carries out integrating the touch control function into the plastic cover by use of the process of plastic injection molding, thereby simplifying the manufacture process, improving the product yield, and meanwhile carrying out a thin and light product.

Figure 1:
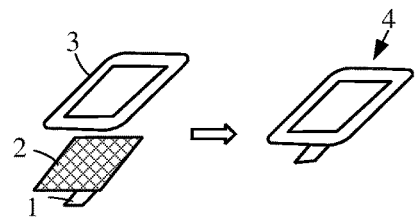
FIG. 1 is a schematic diagram showing an existing touch panel manufacture method.
Figure 2:
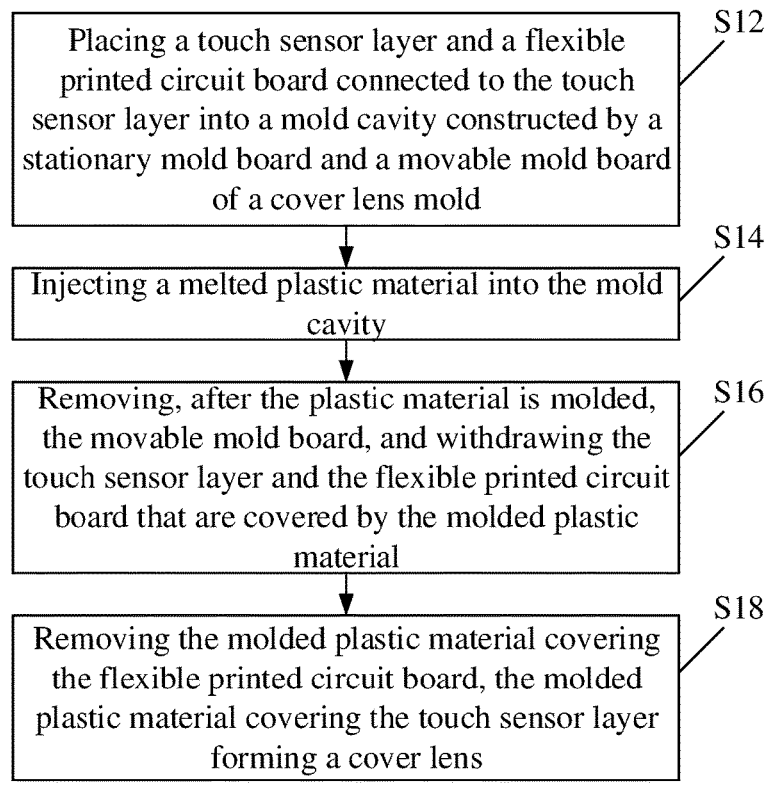
FIG. 2 is a flow chart of a touch panel manufacture method in accordance with the present invention

FIG. 2 is a flow chart of a touch panel manufacture method in accordance with the present invention. FIGS. 3A to 3D are schematic diagrams showing specific manufacture processes of the touch panel in accordance with the present invention. Referring to FIGS. 2 and 3A to 3D, the touch panel manufacture method of the present invention comprises the following steps.

Figure 3A:
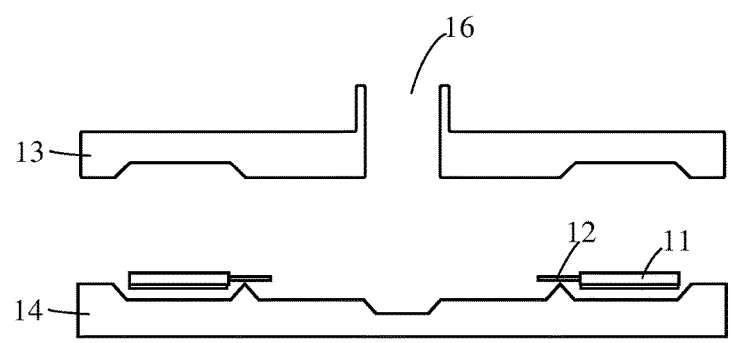
FIGS. 3A to 3D are schematic diagrams showing specific manufacture processes of the touch panel in accordance with the present invention.
Figure 3B:
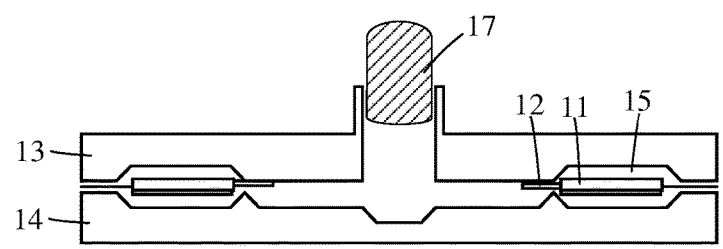

In Step S12, a touch sensor layer 11 and a flexible printed circuit board 12 connected to the touch sensor layer 11 are placed into a mold cavity 15 constructed by a stationary mold board 13 and a movable mold board 14 of a cover lens mold. Referring to FIGS. 3A and 3B, the cover lens mold or the plastic cover mold comprises the stationary mold board 13 and the movable mold board 14, the stationary mold board 13 is fixed or fastened, and the movable mold board 14 can be moved relatively to the stationary mold board 13. In this step, after the touch sensor layer 11 and the flexible printed circuit board 12 connected thereto are placed at a predetermined position and the movable mold board 14 is moved close to the stationary mold board 13 and is fastened thereto, the touch sensor layer 11 and the flexible printed circuit board 12 connected thereto are thus disposed in the mold cavity 15 constructed by the stationary mold board 13 and the movable mold board 14. The shape of the mold cavity 15 is the same as that of the plastic cover or the cover lens subsequently formed on the touch sensor layer 11.

Figure 3C:
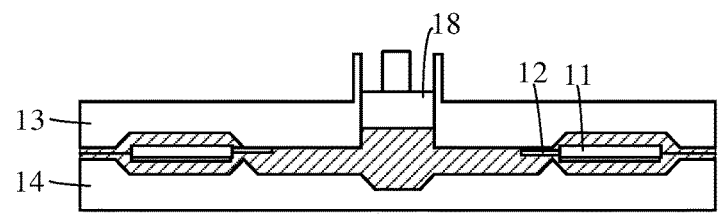

In Step S14, a melted plastic material 17 is injected into the mold cavity 15. Referring to FIGS. 3B and 3C, the melted plastic material 17 is injected into the mold cavity 15 from an entrance 10 of the cover lens mold, and the melted plastic material 17 is pressed by use of a pressing plate 18 such that the plastic material 17 is squeezed into the mold cavity 15. Under a certain pressure, the melted plastic material 17 is injected into the closed mold and evenly fills the mold cavity 15 by use of a nozzle of an injection molding machine and a pouring system of the mold.

In Step S16, after the plastic material 17 is molded, the movable mold board 13 is removed and the touch sensor layer 11 and the flexible printed circuit board 12 that are covered by the molded plastic material are withdrawn. After the mold cavity 15 has been filled with the melted plastic material 17, wait for the plastic material 17 to cool off and then proceed with mold release. After the movable mold board 13 is taken off, the melted plastic material 17 thus becomes a plastic piece after solidified (FIG. 3C shows that two plastic pieces are molding simultaneously). At this point, the withdrawn touch sensor layer 11 and flexible printed circuit board 12 are both covered by the molded plastic material.

Figure 3D:
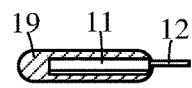

In Step S18, the molded plastic material covering the flexible printed circuit board 12 is removed. The molded plastic material covering the touch sensor layer 11 forms the cover lens 19. The touch sensor layer 11 and the flexible printed circuit board 12 withdrawn in Step S16 are both covered by the molded plastic material. At this point, it is necessary to remove the molded plastic material covering the flexible printed circuit board 12. That is, there is a need to separate the plastic material and the flexible printed circuit board 12 so as to expose the electrical contacts thereof. The molded plastic material covering the touch sensor layer 11 is the cover lens 19 (as shown in FIG. 3D). Therefore, a cover lens or plastic cover 19 integrating with touch control function is manufactured. That is, the manufacture of touch panel is accomplished (as shown in FIG. 3D).

In one embodiment, before the touch sensor layer 11 and the flexible printed circuit board 12 are placed into the mold cavity 15, surface treatment can be carried out on the surface of the flexible printed circuit board 12 so as to form a surface treatment layer thereon. After the plastic injection molding and the mold release, the molded plastic material covering the flexible printed circuit board 12 can be peeled off from the surface treatment layer of the flexible printed circuit board 12 during the step of removing the molded plastic material covering the flexible printed circuit board 12. The surface treatment layer can offer protection in the process of removing the molded plastic material covering the flexible printed circuit board 12.

In another embodiment, before the touch sensor layer 11 and the flexible printed circuit board 12 are placed into the mold cavity 15, a protective film can be attached onto the surface of the flexible printed circuit board 12. After the plastic injection molding and the mold release, the protective film can be torn from the surface of the flexible printed circuit board 12 so as to remove the molded plastic material formed on the protective film during the step of removing the molded plastic material covering the flexible printed circuit board 12. The protective film can offer protection in the process of removing the molded plastic material covering the flexible printed circuit board 12.

In the touch panel manufacture method of the present invention, the touch sensor layer 11 and the flexible printed circuit board 12 connected to the touch sensor layer 11 are placed into the mold cavity 15 constructed by the stationary mold board 13 and the movable mold board 14 of the cover lens mold or plastic cover mold. After plastic injection, molding, and mold release, the molded plastic material covering the flexible printed circuit board 12 is removed. The molded plastic material covering the touch sensor layer 11 thus forms the cover lens or plastic cover 19, thereby accomplishing the manufacture of touch panel. The touch sensor layer 11 is integrated on the cover lens 19 as soon as the cover lens 19 is molded, and thus it can be avoided to use the existing adhering approach. Therefore, the present invention can solve the problem of difficulty to adhere a curved cover lens to the touch sensor layer 11 in the existing skills. The touch panel manufacture method of the present invention can easily apply the curved cover lens integrating with touch control function to a curved display screen.

Meanwhile, the present invention can also decrease the overall thickness of a device (e.g., a smart phone) and increase the product yield.

Figure 4A:
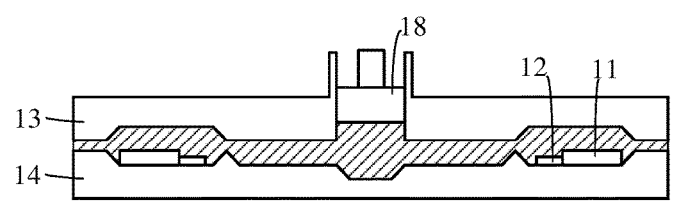
FIG. 4A is a schematic diagram showing an exemplary position a touch sensor layer and a flexible printed circuit board are placed at in accordance with an embodiment of the present invention.
Figure 4B:
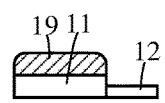
FIG. 4B is a schematic diagram showing a touch panel formed by a touch sensor layer and a cover lens covering the touch sensor layer.

FIG. 4A is a schematic diagram showing an exemplary position the touch sensor layer 11 and the flexible printed circuit board 12 are placed at in accordance with an embodiment of the present invention. FIG. 4B is a schematic diagram showing a touch panel formed by the touch sensor layer 11 and the cover lens 19 covering the touch sensor layer 11. In this embodiment, the touch sensor layer 11 and the flexible printed circuit board 12 are placed on the surface (e.g., the bottom surface) of the stationary mold board 14. In such a way, only one surface of the touch sensor layer 11 and the flexible printed circuit board 12 is covered by the molded plastic material. The molded plastic material covering the flexible printed circuit board 12 is removed in the end. This implement is also feasible in the present invention.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A method for manufacturing a touch panel, comprising the steps of:

attaching a protective film on a surface of a flexible printed circuit board;

placing a touch sensor layer and the flexible printed circuit board connected to the touch sensor layer into a mold cavity constructed by a stationary mold board and a movable mold board of a cover lens mold and placing the touch sensor layer and the flexible printed circuit board on a surface of the stationary mold board;

injecting a melted plastic material into the mold cavity and pressing the melted plastic material by use of a pressing plate such that the plastic material is squeezed into the mold cavity;

removing, after the plastic material is molded, the movable mold board, and withdrawing the touch sensor layer and the flexible printed circuit board that are covered by the molded plastic material; and removing the molded plastic material covering the flexible printed circuit board by tearing the protective film from the surface of the flexible printed circuit board so as to remove the molded plastic material formed on the protective film, the molded plastic material covering the touch sensor layer forming a cover lens.

* * * * *